United States Patent
Shiraishi et al.

(10) Patent No.: US 8,240,044 B2
(45) Date of Patent: Aug. 14, 2012

(54) METHOD FOR ADJUSTING UNEVENNESS OF TOP FLANGE OF WIND TURBINE GENERATOR TOWER

(75) Inventors: Yasuaki Shiraishi, Tokyo (JP); Masashi Sasaki, Tokyo (JP); Kuniichi Watanabe, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/871,282

(22) Filed: Aug. 30, 2010

(65) Prior Publication Data

US 2011/0138893 A1    Jun. 16, 2011

(51) Int. Cl.
*B21K 25/00* (2006.01)
*B23P 6/00* (2006.01)
*F03D 9/00* (2006.01)
*G01M 1/00* (2006.01)

(52) U.S. Cl. .............. 29/889.2; 29/402.01; 29/402.03; 73/66; 290/55

(58) Field of Classification Search .............. 29/889.2, 29/402.01, 402.03; 73/66; 290/52, 55
See application file for complete search history.

(56) References Cited

U.S. PATENT DOCUMENTS

2008/0292408 A1 * 11/2008 Kothnur et al. .............. 405/228
2009/0134628 A1 * 5/2009 Stiesdal ..................... 290/55

FOREIGN PATENT DOCUMENTS

JP    2006119005    *  5/2006
JP    2008-286081       11/2008

* cited by examiner

*Primary Examiner* — Alexander P Taousakis
(74) *Attorney, Agent, or Firm* — Manabu Kanesaka; Kenneth M. Berner; Benjamin H. Hauptman

(57) ABSTRACT

The unevenness of the upper surface of a top flange of a wind turbine generator tower is adjusted by arranging shim plates on the upper surface of the top flange and by adjusting the thicknesses and/or number of the shim plates to be disposed at individual positions. First, the roughness levels of the upper surface of the top flange are measured at a plurality of measuring points in a state in which a nacelle of the wind turbine generator is not mounted on the tower, which is vertically erected. Next, the thicknesses and/or number of the shim plates to be disposed on the individual plurality of measuring points to adjust the unevenness of the upper surface of the top flange are determined in accordance with the measured roughness levels of the upper surface of the top flange.

10 Claims, 11 Drawing Sheets

METHOD FOR ADJUSTING UNEVENNESS OF TOP FLANGE OF WIND TURBINE GENERATOR TOWER

BACKGROUND OF THE INVENTION

1. Field of the Invention

The present invention relates to a method for adjusting the unevenness (flatness) of the top flange of a wind turbine generator tower.

2. Description of Related Art

In wind turbine generators, a rolling bearing that supports the nacelle of the wind turbine generator so as to allow yawing is mounted on the top flange of a wind turbine generator tower (hereinafter referred to as "tower"). To ensure the performance of this rolling bearing, the upper surface of the top flange of the tower needs a high level of flatness. However, in a constructed wind turbine generator or a wind turbine generator newly being constructed, unevenness is sometimes found on the upper surface of the tower top flange.

In this case, the unevenness of the upper surface of the tower top flange needs to be adjusted.

Although the unevenness has conventionally been adjusted by, for example, a method involving cutting away protrusions of the uneven upper surface of the top flange, such a method requires much time and labor to adjust the unevenness of the upper surface of the top flange, such as requiring a support base for a special milling machine.

BRIEF SUMMARY OF THE INVENTION

The present invention is made in consideration of the above-described circumstances, and it is an object thereof to provide a method for adjusting the unevenness of the top flange of a wind turbine generator tower in which the unevenness of the upper surface of the top flange can be reliably adjusted by a simple operation.

The present invention adopts the following solutions to solve the above problems.

A method for adjusting the unevenness of a top flange of a wind turbine generator tower according to the present invention is a method for adjusting the unevenness of a top flange of a wind turbine generator tower for adjusting the unevenness of the upper surface of the top flange by arranging shim plates having a planar shape obtained by dividing the upper surface of the top flange of the wind turbine generator tower into a plurality of parts and by adjusting the thicknesses and/or number of the shim plates to be disposed at individual positions, the method comprising: a main measurement step of measuring the roughness levels of the upper surface of the top flange at a plurality of measuring points in a state in which a nacelle of the wind turbine generator is not mounted on the tower, which is vertically erected; a shim-plate-placement-plan determination step of determining the thicknesses and/or number of the shim plates to be disposed on the individual plurality of measuring points to adjust the unevenness of the upper surface of the top flange in accordance with the roughness levels of the upper surface of the top flange measured in the main measurement step; and a shim-plate placement step of placing the shim plates on the individual plurality of measuring points on the upper surface of the top flange in accordance with the thicknesses and/or number of the shim plates determined in the shim-plate-placement-plan determination step.

According to the method for adjusting the unevenness of the top flange of the wind turbine generator tower described above, since the unevenness of the upper surface of the top flange of the wind turbine generator tower is adjusted by arranging shim plates having a planar shape obtained by dividing the upper surface of the top flange of the wind turbine generator tower into a plurality of parts on the upper surface of the top flange and by adjusting the thicknesses and/or number of shim plates to be disposed at individual positions, the unevenness of the top flange of the tower of either the constructed wind turbine generator or the wind turbine generator newly being constructed can be reliably adjusted by a simple operation.

In particular, since the unevenness of the upper surface of the top flange is adjusted by adjusting the thicknesses and/or number of shim plates, the unevenness of the top flange can be adjusted in a short time.

Preferably, the method for adjusting the unevenness of a top flange of a wind turbine generator tower according to the present invention further includes an auxiliary measurement step of measuring the roughness levels of the upper surface of the top flange at the plurality of measuring points, prior to the main measurement step, in a state in which the nacelle is mounted on the tower, which is vertically erected; and a shim-plate-placement-plan estimation step of estimating, in advance, the thicknesses and/or number of the shim plates to be determined in the shim-plate-placement-plan determination step from the roughness levels of the upper surface of the top flange measured in the auxiliary measurement step.

With such a configuration, in the case where the unevenness of the upper surface of the top flange of the tower of the constructed wind turbine generator is adjusted, the auxiliary measurement step of measuring the roughness levels of the upper surface of the top flange is performed in the state in which the nacelle is mounted on the tower before the nacelle is removed from the top of the tower prior to the main measurement step of measuring the roughness levels of the upper surface of the top flange, with the nacelle removed from the top of the tower. Then, the shim-plate-placement-plan estimation step of estimating the thicknesses and/or number of shim plates necessary for adjusting the unevenness of the top flange in advance from the roughness levels of the upper surface of the top flange measured in the auxiliary measurement step is performed.

Accordingly, rather than preparing the shim plates necessary for adjusting the unevenness of the top flange after completion of the main measurement step and the shim-plate-placement-plan determination step, the thicknesses and/or number of shim plates necessary for adjusting the unevenness of the top flange can be roughly estimated in the shim-plate-placement-plan estimation step immediately after the auxiliary measurement step, and the shim plates of the estimated plate thicknesses and/or number can be prepared in advance. This can shorten the construction period necessary for adjusting the unevenness of the top flange as compared with a case in which the shim plates are prepared after completion of the main measurement step and the shim-plate-placement-plan determination step.

Preferably, the method for adjusting the unevenness of a top flange of a wind turbine generator tower, described above, is configured such that in the auxiliary measurement step, the roughness levels of the lower surface of the top flange and the plate thicknesses of the top flange at the plurality of measuring points are measured, and the roughness levels of the upper surface of the top flange are obtained from the roughness levels of the lower surface of the top flange and the plate thicknesses of the top flange.

When the roughness levels of the upper surface of the top flange are measured in the auxiliary measurement step, the roughness levels of the upper surface of the top flange cannot be directly measured because the nacelle is mounted on the upper surface of the top flange of the tower. However, with the above configuration, the roughness levels of the lower surface of the top flange and the plate thicknesses of the top flange are measured, and then the roughness levels of the upper surface of the top flange are calculated from the roughness levels of the lower surface of the top flange and the plate thicknesses of the top flange. Therefore, even if the nacelle is mounted on the top flange of the tower, the roughness levels of the upper surface of the top flange can be measured.

Preferably, the method for adjusting the unevenness of a top flange of a wind turbine generator tower, described above, is configured such that the plate thicknesses of the top flange are measured from the lower surface of the top flange by ultrasonic plate-thickness measurement.

When the roughness levels of the upper surface of the top flange are measured in the auxiliary measurement step, the plate thicknesses of the top flange cannot be directly measured because the nacelle is mounted on the top flange of the tower. However, with the above configuration, the plate thicknesses of the top flange are measured from the lower surface of the top flange by ultrasonic plate thickness measurement. Therefore, even though the nacelle is mounted on the top flange of the tower, the thicknesses of the top flange can be measured.

Preferably, the method for adjusting the unevenness of a top flange of a wind turbine generator tower according to the present invention further includes an auxiliary measurement step of measuring the roughness levels of the upper surface of the top flange at a plurality of measuring points, prior to the main measurement step, before the tower is vertically erected; and a shim-plate-placement-plan estimation step of estimating, in advance, the thicknesses and/or number of the shim plates to be determined in the shim-plate-placement-plan determination step from the roughness levels of the upper surface of the top flange measured in the auxiliary measurement step.

With this configuration, in the case where the unevenness of the upper surface of the top flange of the tower of the wind turbine generator newly being constructed is adjusted, the auxiliary measurement step of measuring the roughness levels of the upper surface of the top flange is performed in the state in which the tower is placed horizontally before the tower is vertically erected, prior to the main measurement step of measuring the roughness levels of the upper surface of the top flange after the tower is vertically erected. Then, the shim-plate-placement-plan estimation step of estimating the thicknesses and/or number of shim plates necessary for adjusting the unevenness of the top flange in advance from the roughness levels of the upper surface of the top flange measured in the auxiliary measurement step is performed.

Accordingly, rather than preparing the shim plates necessary for adjusting the unevenness of the top flange after completion of the main measurement step and the shim-plate-placement-plan determination step, the thicknesses and/or number of shim plates necessary for adjusting the unevenness of the top flange can be roughly estimated in the shim-plate-placement-plan estimation step immediately after the auxiliary measurement step, and the shim plates of the estimated plate thicknesses and/or number can be prepared in advance. This can shorten the construction period necessary for adjusting the unevenness of the top flange as compared with a case in which the shim plates are prepared after completion of the main measurement step and the shim-plate-placement-plan determination step.

Preferably, the method for adjusting the unevenness of a top flange of a wind turbine generator tower according to the present invention further includes a determination step of determining, after the shim-plate placement step, whether the level differences among the upper surfaces of the shim plates disposed on the upper surface of the top flange are at or below a predetermined value.

With this configuration, after the shim plates are disposed on the upper surface of the top flange to adjust the unevenness of the upper surface of the top flange, it is determined in the determination step whether the level differences among the upper surfaces of the shim plates are at or below a predetermined value. This allows the accuracy of adjustment of the unevenness of the top flange of the tower to be made more reliable.

If it is determined in this determination step that the level differences among the upper surfaces of the shim plates are not at or below the predetermined value, the main measurement step, the shim-plate-placement-plan determination step, and the shim-plate placement step are performed again to rearrange the shim plates on the upper surface of the top flange. When it is determined that the level differences among the upper surfaces of the rearranged shim plates are at or below the predetermined value, the adjustment of the unevenness of the upper surface of the top flange is completed. This allows the accuracy of adjustment of the unevenness of the top flange of the tower to be made more reliable.

Preferably, the method for adjusting the unevenness of a top flange of a wind turbine generator tower according to the present invention is configured such that, in the shim-plate-placement-plan determination step, the thicknesses and/or number of the shim plates are determined so that the difference in plate thickness between the shim plates disposed next to each other is a predetermined value or less.

With this configuration, since the thicknesses and/or number of the shim plates are determined so that the difference in plate thickness between the shim plates disposed next to each other is a predetermined value or less, the level difference between the adjacent portions of the shim plates can be the predetermined value or less. Although the top flange of the tower is under a large contact pressure from the nacelle, this large contact pressure can be reliably supported by the shim plates disposed on the upper surface of the top flange.

Preferably, the method for adjusting the unevenness of a top flange of a wind turbine generator tower according to the present invention is configured such that, in the main measurement step, the radial inclination of the upper surface of the top flange is measured; and in the shim-plate-placement-plan determination step, the thicknesses and/or number of the shim plates to be disposed on the individual plurality of measuring points to adjust the unevenness of the upper surface of the top flange are determined in accordance with the roughness levels of the upper surface of the top flange and the radial inclination of the upper surface of the top flange measured in the main measurement step.

With this configuration, the radial inclination of the upper surface of the top flange is measured, and the thicknesses and/or number of shim plates to be disposed on the upper surface of the top flange are determined so as to compensate for the measured radial inclination of the upper surface of the top flange. Since the radial inclination of the upper surface of the top flange is compensated for using the shim plates disposed on the upper surface of the top flange, the slant of the rolling bearing that supports the nacelle mounted on the top flange so as to allow yawing can be compensated for.

Preferably, the method for adjusting the unevenness of a top flange of a wind turbine generator tower according to the present invention is configured such that the shim plates have bolt through-holes; and the shim plates are fixed to the upper surface of the top flange using the bolt through-holes.

With this configuration, when the nacelle is fixed to the top flange of the tower with fastening bolts, the fastening bolts are passed through the bolt through-holes formed in the shim plates disposed on the upper surface of the top flange, so that the shim plates are fixed to the top flange, together with the nacelle, with the fastening bolts. Accordingly, the shim plates disposed on the upper surface of the top flange are firmly fastened to the top flange with the bolts, so that the shim plates do not move or come out from the mounted positions after the nacelle is fixed to the top flange of the tower.

Preferably, the method for adjusting the unevenness of a top flange of a wind turbine generator tower according to the present invention is configured such that the shim plates have a substantially sector shape in plan view, obtained by dividing the upper surface of the ring-shaped top flange into a plurality of parts in the circumferential direction of the top flange.

With this configuration, the shim plates can be spread over substantially the entire upper surface of the substantially ring-shaped top flange even if the shim plates have one planar shape. Although the top flange of the tower is under a large contact pressure from the nacelle, this large contact pressure can be reliably supported by the shim plates spread over substantially the entire upper surface of the top flange.

DETAILED DESCRIPTION OF THE INVENTION

A method for adjusting the unevenness of the top flange of a wind turbine generator tower according to an embodiment of the present invention will be described hereinbelow with reference to the drawings.

Figure 1:
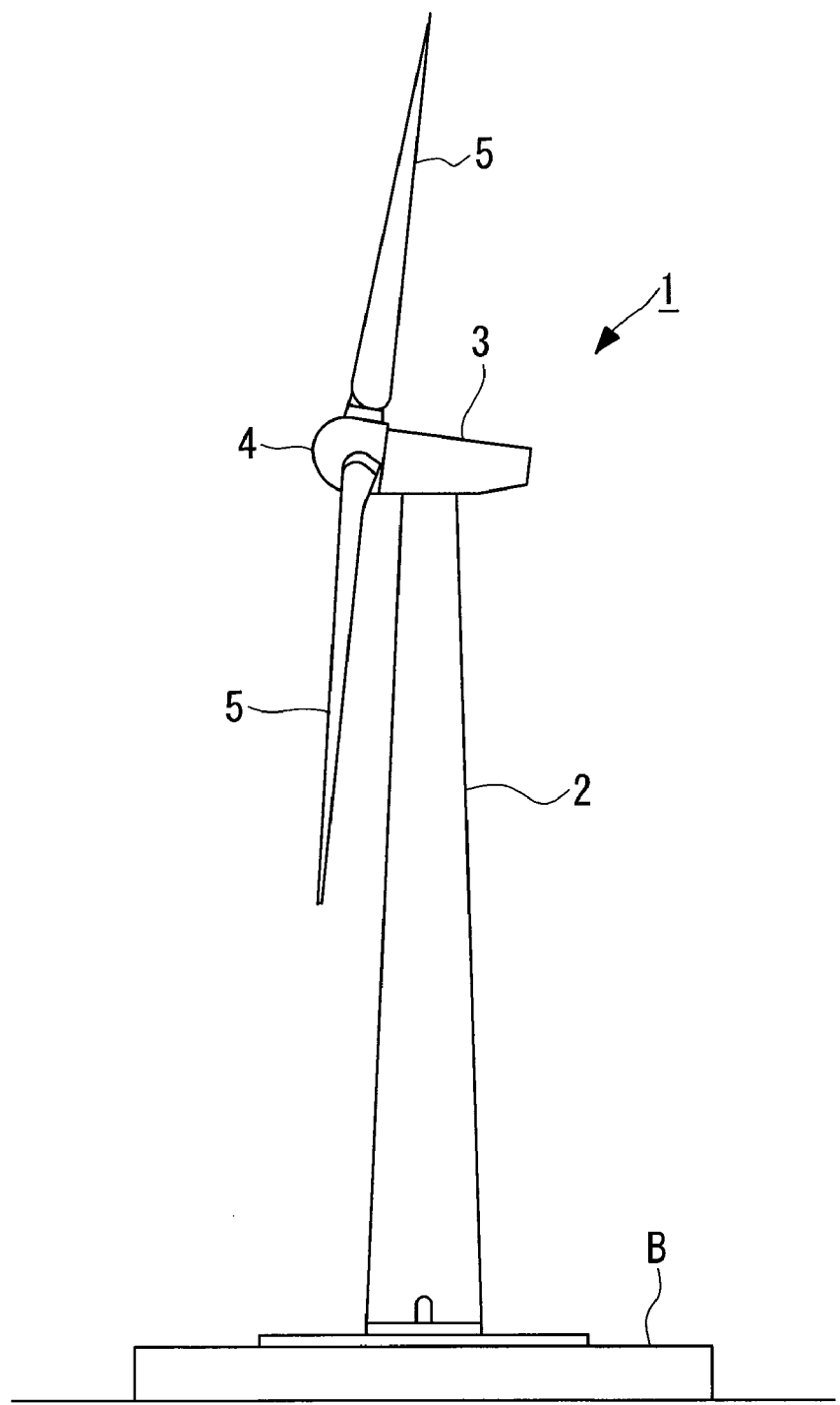
FIG. 1 is a side view illustrating the outline of a wind turbine generator.

The method for adjusting the unevenness of the top flange of a wind turbine generator tower of this embodiment is performed to adjust the unevenness of a top flange 21 provided at the upper end of a tower 2 of a wind turbine generator 1, for example, shown in FIG. 1. The method for adjusting the unevenness of the top flange of a wind turbine generator tower of this embodiment can adjust either the unevenness of the top flange 21 of the tower 2 of a constructed wind turbine generator 1 or the unevenness of the top flange 21 of the tower 2 of a wind turbine generator 1 newly being constructed. Both cases will be described in parallel hereinbelow.

First, the outline of the wind turbine generator 1 to which the method for adjusting the unevenness of the top flange of a wind turbine generator tower of this embodiment is applied will be described.

The wind turbine generator 1 includes a tower 2 that is vertically erected on a base B, a nacelle 3 mounted on the upper end of the tower 2, and a rotor head 4 supported on the front end of the nacelle 3 so as to be rotatable about the substantially horizontal rotation axis thereof.

The rotor head 4 has a plurality of (for example, three) wind turbine blades 5 mounted in a radial pattern about the rotation axis. Thus, the force of wind blowing against the wind turbine blades 5 from the direction of the rotation axis of the rotor head 4 is converted to motive power that rotates the rotor head 4 about the rotation axis.

The rotor head 4 that rotates about the substantially horizontal rotation axis by receiving wind power with the wind turbine blades 5 drives a generator (not shown) installed in the nacelle 3 to generate electricity. The nacelle 3 is mounted on the top flange 21 provided at the upper end of the tower 2 that is vertically erected on the base B via a slew bearing 32 (described below, see FIG. 3) so as to allow yawing about the tower 2.

The tower 2 is constructed in a substantially cylindrical shape with a necessary length (height) by connecting a plurality of steel tower sections with flanges (not shown) provided at both ends thereof.

The method for adjusting the unevenness of the top flange of a wind turbine generator tower of this embodiment is for adjusting the unevenness of the upper surface of the top flange 21 by disposing shim plates 10 and 10A to 10C (described below, see FIG. 12) having various thicknesses and planar shapes obtained by dividing the upper surface of the substantially ring-plate-shaped top flange 21 (see FIGS. 4 and 9) provided at the upper end of the substantially cylindrical tower 2 into 50 equal parts on the upper surface of this top flange 21 and by adjusting the thicknesses and/or number of the shim plates 10 and 10A to 10C to be disposed at individual positions.

The working process of the method for adjusting the unevenness of the top flange of a wind turbine generator tower of this embodiment will be described hereinbelow in sequence.

In a case where the unevenness of the top flange 21 of the tower 2 of a constructed wind turbine generator 1 is to be adjusted by the method for adjusting the top flange of a wind turbine generator tower of this embodiment, first, the roughness levels of the upper surface of the top flange 21 of the tower 2 are measured at a plurality of measuring points (described later), with the nacelle 3 mounted on the tower 2 that is vertically erected on the base B (auxiliary measurement step).

In the case where the unevenness of the top flange 21 of the tower 2 of the constructed wind turbine generator 1 is to be adjusted, the measurement of the roughness levels of the upper surface of the top flange 21 of the tower 2 in the auxiliary measurement step is specifically performed as follows:

If measurement of the roughness levels of the upper surface of the top flange 21 is attempted, with the nacelle 3 mounted on the tower 2, as described above, the roughness levels of the upper surface of the top flange 21 cannot be directly measured because the upper surface of the top flange 21 of the tower 2 is hidden by the lower end of the nacelle 3.

Therefore, the roughness levels of the lower surface of the top flange 21 and the plate thicknesses 21T of the top flange 21 are measured at the individual plurality of measuring points. Thus, the roughness levels at the individual measuring points of the upper surface of the top flange 21 are obtained by calculation from the roughness levels of the lower surface of the top flange 21 and the plate thicknesses 21T of the top flange 21.

Figure 2:
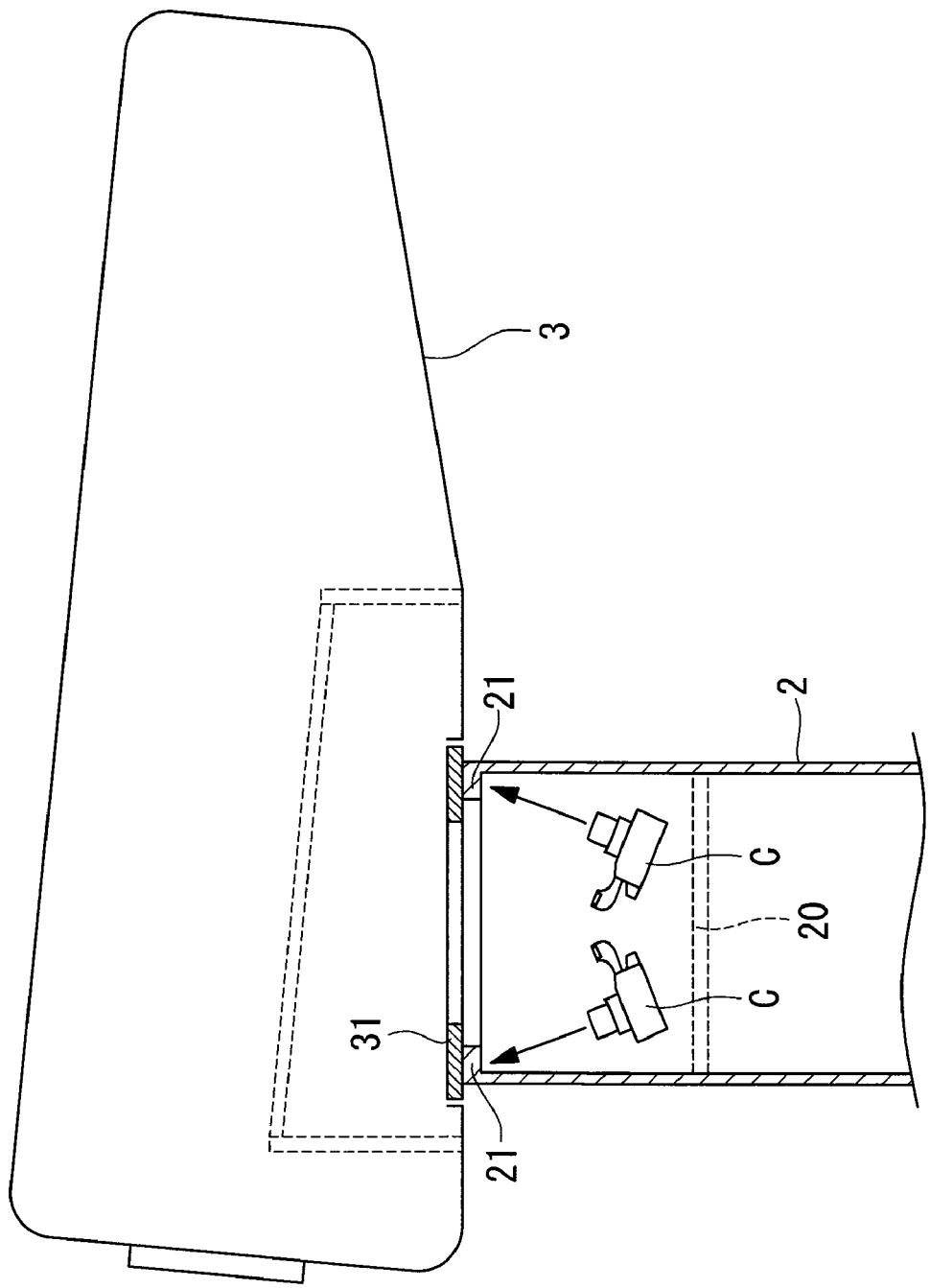
FIG. 2 is a cross-sectional view illustrating the state of measurement of the roughness levels of the upper surface of a top flange of a tower, with a nacelle mounted on the tower, in an embodiment of a method for adjusting the unevenness of the top flange of a wind turbine generator tower according to the present invention.
Figure 3:
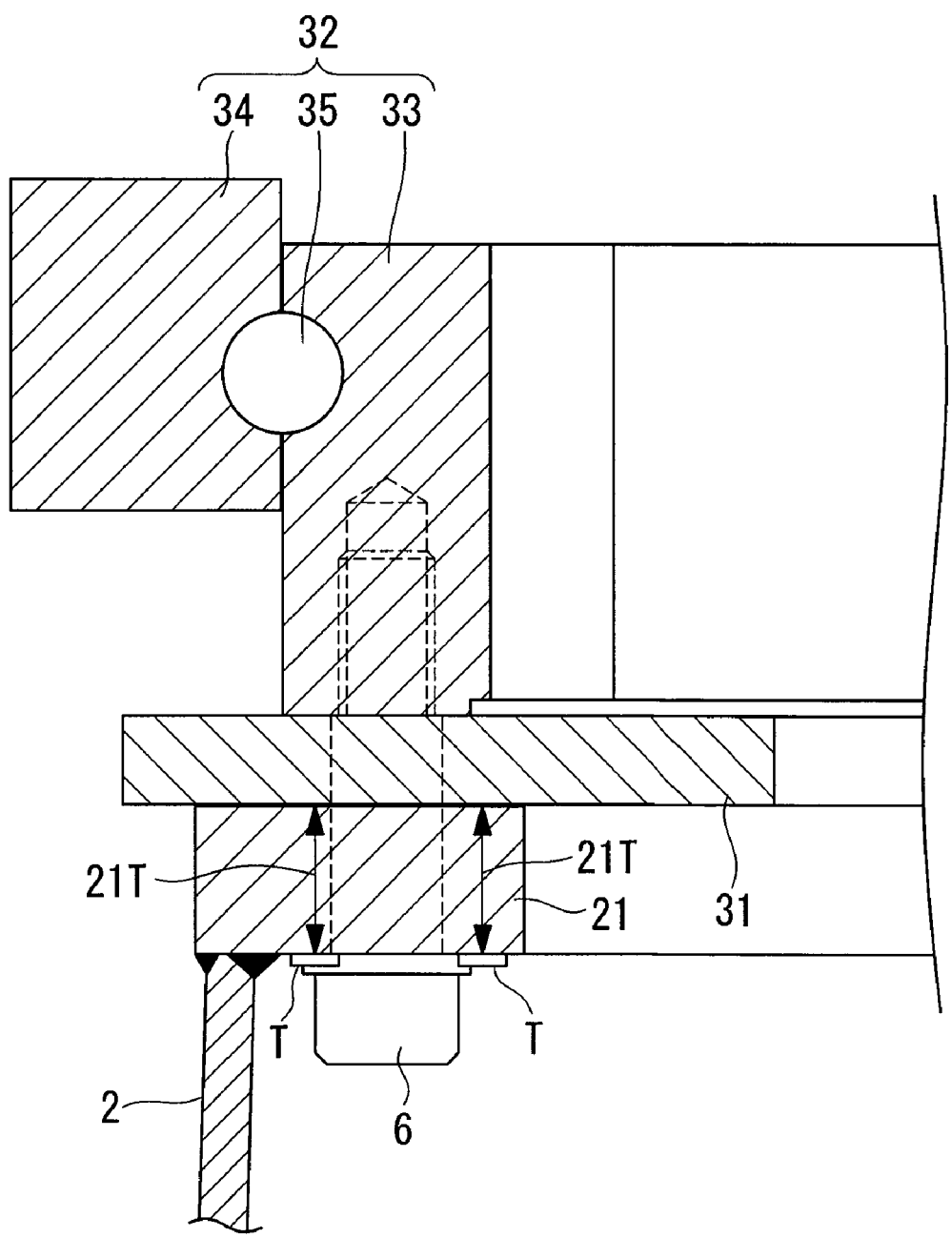
FIG. 3 is an enlarged detailed cross-sectional view illustrating the state of measurement of the roughness levels of the upper surface of the top flange of the tower shown in FIG. 2.

The measurement of the roughness levels of the lower surface of the top flange 21 is performed in such a manner that the three-dimensional coordinates of the individual measuring points on the lower surface of the top flange 21 are measured by a three-dimensional-coordinate measuring system, with the nacelle 3 mounted on the top flange 21 of the tower 2. In this embodiment, a known digital camera measuring system is used as the three-dimensional-coordinate measuring system. As shown in FIGS. 2 and 3, this digital camera measuring system is configured such that measurement targets T formed of reflective seals are affixed on the individual measuring points of the lower surface of the top flange 21, a plurality of images of the lower surface of the top flange 21 are acquired under a strobe light by a digital camera C, the plurality of images are loaded into a computer, and, in the images loaded in the computer, the positions of the measurement targets T that reflect strobe light to emit light are analyzed with dedicated software to thereby find the three-dimensional coordinates (x, y, z) of the individual measuring points to which the measurement targets T are affixed. An example of the digital camera measuring system is the Digital camera three-dimensional measuring system PIXXIS™ manufactured by Ryonichi Engineering Co. Ltd.

Figure 6:
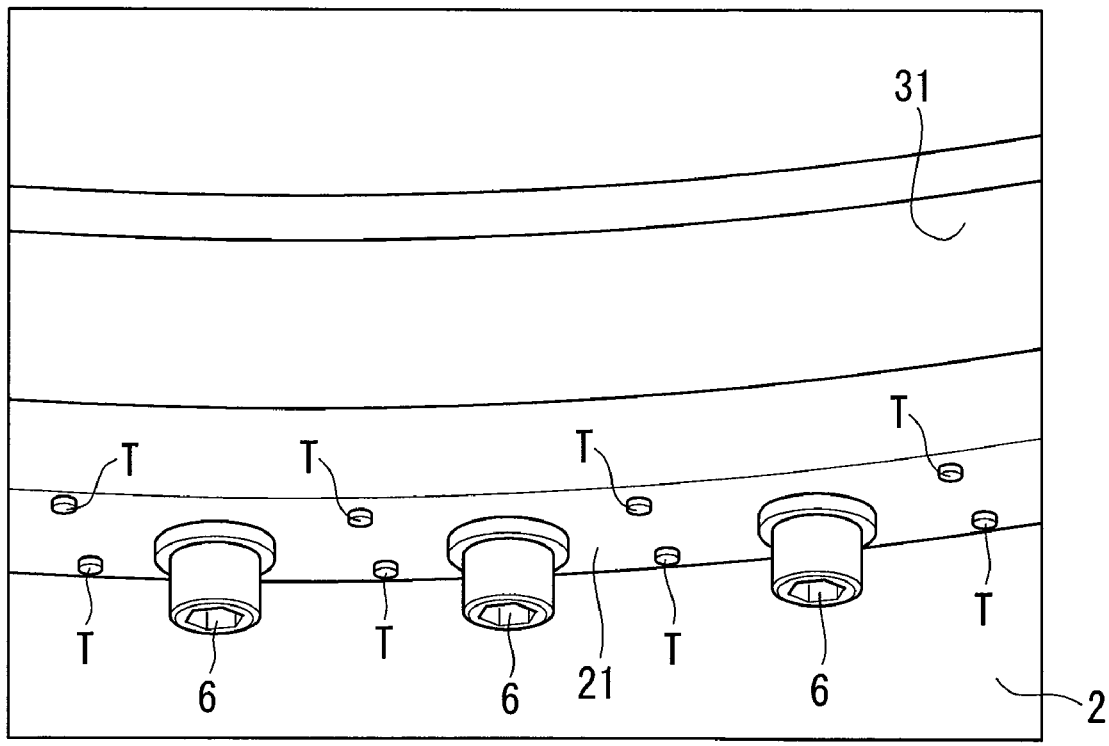
FIG. 6 is a perspective view illustrating the state of measurement of the roughness levels of the upper surface of the top flange of the tower shown in FIG. 2.
Figure 7:
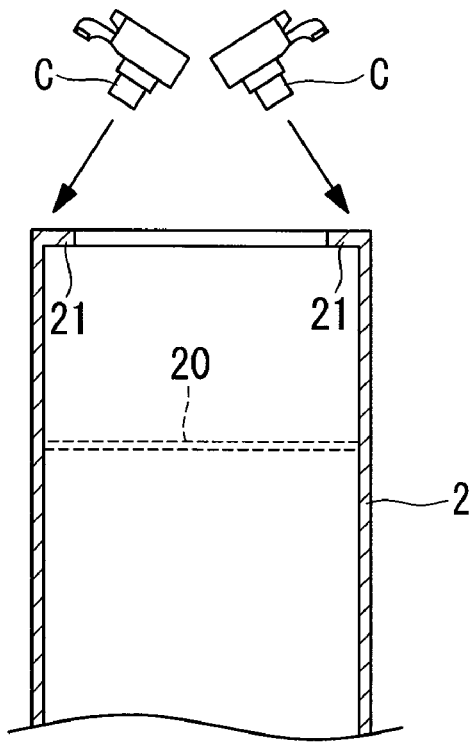
FIG. 7 is a cross-sectional view illustrating the state of measurement of the roughness levels of the upper surface of the top flange of the tower, with the nacelle removed from the tower, in an embodiment of a method for adjusting the unevenness of the top flange of a wind turbine generator tower according to the present invention.
Figure 8:
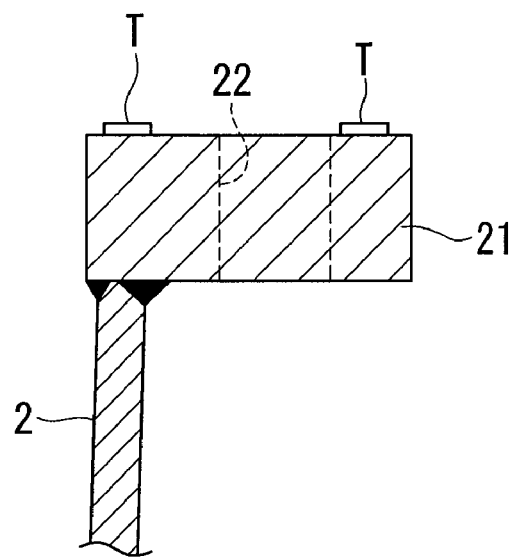
FIG. 8 is an enlarged detailed cross-sectional view illustrating the state of measurement of the roughness levels of the upper surface of the top flange shown in FIG. 7.

When acquiring images of the lower surface of the top flange 21 of the tower 2 with the digital camera C, the cameraman stands on a floor 20 for inspection and working provided in the tower 2, with the digital camera C held upward, as shown in FIG. 2, and acquires a plurality of images of the lower surface of the top flange 21 in such a manner that the plurality of measurement targets T are shown in the acquired images, as shown in FIG. 6.

As shown in FIG. 3, the wind turbine generator 1 of this embodiment is configured such that an inner race 33 of a slew bearing 32 and a brake disc 31, which are provided at the lower end of the nacelle 3, are fixed to the top flange 21 of the tower 2 with fastening bolts 6. The slew bearing 32 includes, as main components, the inner race 33, an outer race 34, and a plurality of steel balls 35 fitted between the inner race 33 and the outer race 34. The outer race 34 rotates relative to the inner race 33 to allow the main body of the nacelle 3 supported by the outer race 34 to yaw slew relative to the tower 2. Since the inner race 33 of the slew bearing 32 and the brake disc 31 are firmly fixed to the top flange 21 of the tower 2 with the fastening bolts 6, if there is unevenness on the upper surface of the top flange 21, the inner race 33 of the slew bearing 32 and the brake disc 31 fixed to the upper surface of the top flange 21 are deformed along the unevenness of the top flange 21, exerting a negative influence on the movement of the slew bearing 32, that is, the yawing operation of the nacelle 3. To prevent such a negative influence, the method for adjusting the unevenness of the top flange of the wind turbine generator tower of this embodiment is performed on the top flange 21 of the tower 2.

Figure 4:
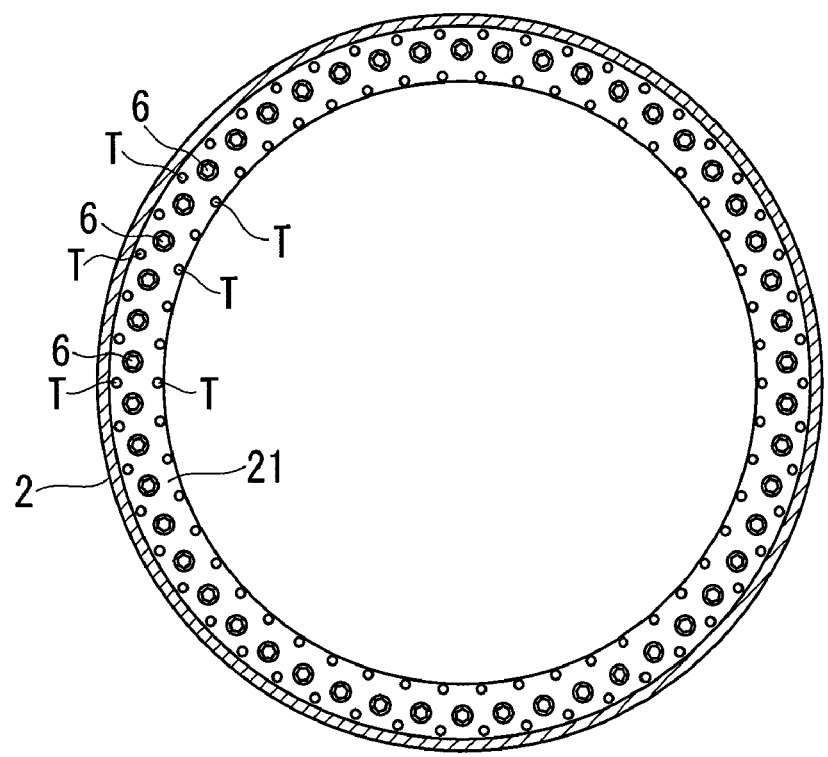
FIG. 4 is a bottom view of the top flange of the tower, illustrating measuring points at which the roughness levels of the upper surface of the top flange are measured, with the nacelle mounted on the top flange.
Figure 5:
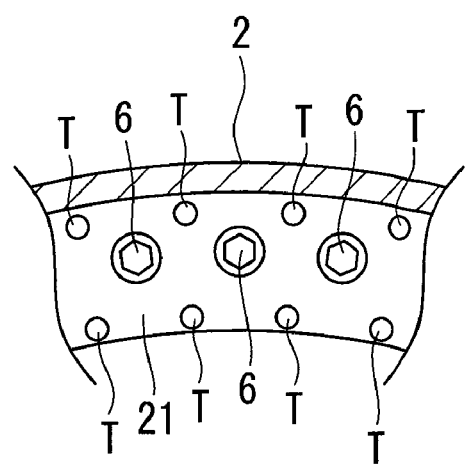
FIG. 5 is an enlarged detail view illustrating the measuring points shown in FIG. 4.

FIGS. 4 and 5 show the positions of the plurality of measuring positions on the lower surface of the top flange 21 of the tower 2, that is, the affixed positions of the measurement targets T. FIG. 5 is a partial enlarged view of FIG. 4. As shown in FIGS. 4 and 5, in this embodiment, the inner race 33 of the slew bearing 32 and the brake disc 31 provided at the lower end of the nacelle 3 are fixed to the top flange 21 of the tower 2 with 50 fastening bolts 6. The fastening bolts 6 are numbered No. 1 to No. 50.

To prevent interference between the measurement targets T affixed to the individual measuring points on the lower surface of the top flange 21 and the fastening bolts 6 that fix the nacelle 3 to the top flange 21 and to ensure that measurement targets T are captured in images acquired by the digital camera C without being hidden behind the fastening bolts 6, as shown in FIG. 6, the measurement targets T are affixed to 100 positions on the lower surface of the top flange 21 so as to be located around the inner circumference and the outer circumference between the fastening bolts 6 and 6, as shown in FIGS. 4 and 5.

The measurement of the plate thicknesses 21T of the top flange 21 is performed such that the individual measuring points on which the measurement targets T are affixed are measured from the lower surface of the top flange 21 by an ultrasonic plate-thickness measuring device, with the nacelle 3 mounted on the tower 2, like the measurement of the roughness levels of the lower surface of the top flange 21.

Thus, the roughness levels at the individual measuring points of the upper surface of the top flange 21 are calculated from the roughness levels of the lower surface of the top flange 21 and the plate thicknesses 21T of the top flange 21 at the individual measuring points, measured as described above. As a result, the measurement of the roughness levels of the upper surface of the top flange 21, with the nacelle 3 mounted on the tower 2, is completed.

Next, estimated levels of roughness that will appear on the upper surface of the top flange 21 after the nacelle 3 is removed from the top flange 21 of the tower 2 are calculated from the roughness levels of the upper surface of the top flange 21 measured in the above auxiliary measurement step, that is, the roughness levels at the individual measuring points of the upper surface of the top flange 21, with the nacelle 3 mounted on the top flange 21 of the tower 2. Here, after the nacelle 3 is removed from the top flange 21 of the tower 2, the top flange 21 comes into a released state in which there is no vertical load or vertical rigidity. Therefore, the estimated roughness levels are calculated on the assumption that, after the nacelle 3 is removed from the top flange 21 of the tower 2, the unevenness of the top flange 21 is more than the case where the nacelle 3 is mounted on the top flange 21. Then, the thicknesses and/or number of the roughness compensating shim plates 10 to be disposed at the individual measuring points to adjust unevenness that will occur on the top flange 21 after the nacelle 3 is removed from the top flange 21 of the tower 2 are estimated (shim-plate-placement-plan estimation step).

In this embodiment, combinations of ten plate thicknesses, that is, 0.2 mm, 0.3 mm, 0.4 mm, 0.5 mm, 0.6 mm, 0.8 mm, 1.0 mm, 1.5 mm, 2.0 mm, and 3.0 mm, are used as the roughness compensating shim plates 10. For example, in a case where it is estimated that a shim plate having a thickness of 0.9 mm needs to be disposed at a certain measuring point to adjust the unevenness that will occur on the top flange 21, it is estimated that two shim plates, one with a thickness of 0.5 mm and one with a thickness of 0.4 mm, should be disposed at this measuring point. Thus, the thicknesses and/or number of the roughness compensating shim plates 10 to be disposed at the individual measuring points to adjust the unevenness that will occur on the top flange 21 of the tower 2 after the nacelle 3 is removed from the top flange 21 are estimated. The roughness compensating shim plates 10 with the estimated plate thicknesses and/or number are manufactured in preparation for use in a shim-plate placement step (described below).

In a case where the unevenness of the top flange 21 of the tower 2 of the wind turbine generator 1 newly being constructed is to be adjusted by the method for adjusting the unevenness of the top flange of a wind turbine generator tower of this embodiment, the roughness levels of the upper surface of the top flange 21 are measured at a plurality of measuring points not in the state in which the nacelle 3 is mounted on the tower 2, as described above, but in a state in which the tower 2 is placed horizontally before being vertically erected on the base B (auxiliary measurement step). In this case, since the nacelle 3 is not yet mounted on the tower 2, the upper surface of the top flange 21 of the tower 2 is not hidden by the slew bearing 32 and the brake disc 31 provided at the lower end of the nacelle 3, so that the roughness levels of the upper surface of the top flange 21 can be directly measured.

Therefore, by affixing the measurement targets T not to the lower surface of the top flange 21 but directly to the upper surface and measuring the three-dimensional coordinates of the individual measuring points, to which the measurement targets T are affixed, using the above-described digital camera measuring system, the roughness levels at the individual measuring points of the upper surface of the top flange 21 are directly measured. The measurement targets T are affixed to 100 positions of the upper surface of the top flange 21 so as to be located around the inner circumference and the outer circumference in the vicinity of the bolt through-holes 22 provided at 50 positions of the top flange 21 so that the fastening bolts 6 for fixing the inner race 33 of the slew bearing 32 and the brake disc 31 provided at the lower end of the nacelle 3 to the top flange 21 of the tower 2 pass therethrough. As a result, measurement of the roughness levels of the upper surface of the top flange 21 in the state in which the tower 2 is placed horizontally before being vertically erected on the base B is completed.

In the case where the unevenness of the top flange 21 of the tower 2 of the wind turbine generator 1 newly being constructed is to be adjusted, the measurement of the thicknesses of the top flange 21 is not performed because it is not necessary.

Next, estimated levels of roughness that will occur on the upper surface of the top flange 21 after the tower 2 is vertically erected on the base B are calculated from the roughness levels of the upper surface of the top flange 21 measured in the above-described auxiliary measurement step, that is, the roughness levels at the individual measuring points of the upper surface of the top flange 21 in the state in which the nacelle 3 is placed horizontally before the tower 2 is vertically erected on the base B. The thicknesses and/or number of the roughness compensating shim plates 10 to be disposed at the individual measuring points to adjust the unevenness that will occur on the top flange 21 after the tower 2 is vertically erected on the base B are estimated (shim-plate-placement-plan estimation step), and the roughness compensating shim plates 10 with the estimated plate thicknesses and/or number are manufactured for use in a shim-plate placement step (described below).

In the case where the unevenness of the top flange 21 of the tower 2 of the constructed wind turbine generator 1 is adjusted, following the auxiliary measurement step and the shim-plate-placement-plan estimation step described above, the nacelle 3 is removed from the top flange 21 of the vertically erected tower 2, in which the top flange 21 is released from vertical load and vertical rigidity, the roughness levels of the upper surface of the top flange 21 and the radial inclination of the top flange 21 are measured at the plurality of measuring points (main measurement step).

In the case where the unevenness of the wind turbine generator 1 newly being constructed is adjusted, following the auxiliary measurement step and the shim-plate-placement-plan estimation step, described above, the tower 2 is vertically erected on the base B, and the roughness levels of the upper surface of the top flange 21 and the radial inclination of the top flange 21 are measured at the plurality of measuring points before the nacelle 3 is mounted on the vertically erected tower 2 (main measurement step).

Specifically, the measurement of the roughness levels of the upper surface of the top flange 21 of the tower 2 and the radial inclination of the upper surface of the top flange 21 in the main measurement step are performed as follows:

The measurement of the roughness levels of the upper surface of the top flange 21 is performed such that the three-dimensional coordinates (x, y, z) of the individual measuring points of the upper surface of top flange 21 are measured by the three-dimensional-coordinate measuring system, with the nacelle 3 not mounted on the top flange 21 of the tower 2, as described above. Here, the above-described digital camera measuring system is used again as the three-dimensional-coordinate measuring system.

As shown in FIGS. 7 to 10, the measurement targets T of the digital camera measuring system are affixed to 100 positions of the upper surface of the top flange 21 so as to be located along the inner circumference and the outer circumference in the vicinity of the bolt through-holes 22 provided at 50 positions of the top flange 21.

Figure 9:
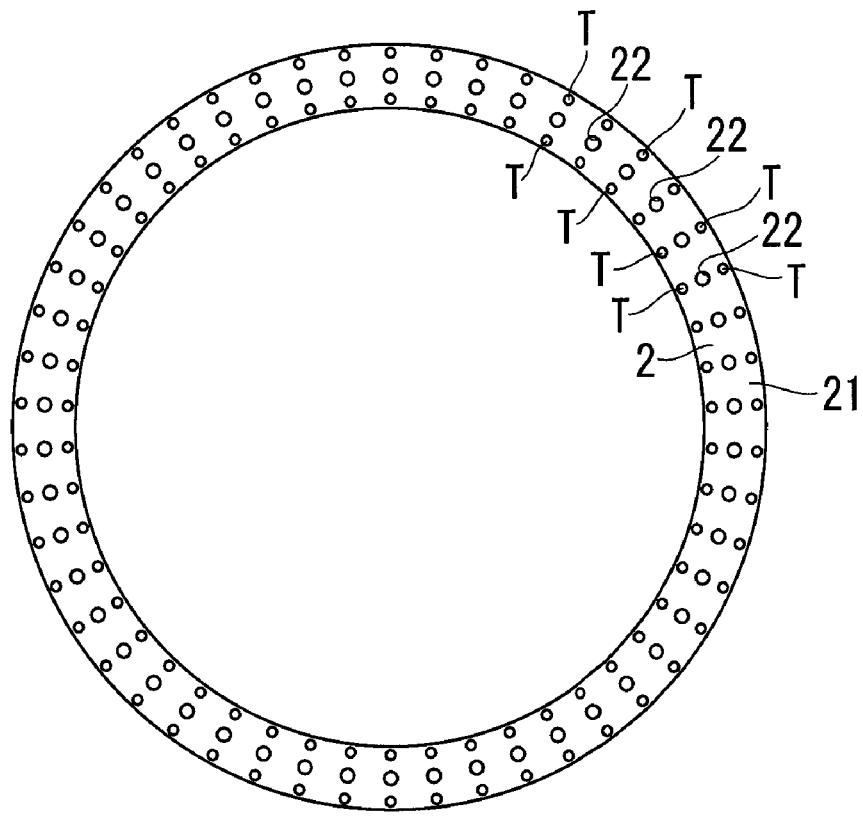
FIG. 9 is a top view of the top flange of the tower, illustrating measuring points at which the roughness levels of the upper surface of the top flange are measured, with the nacelle removed from the top flange.
Figure 10:
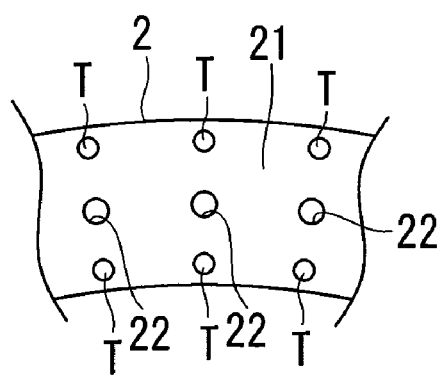
FIG. 10 is an enlarged detail view illustrating the measuring points shown in FIG. 9.

FIGS. 9 and 10 show the positions of the individual measuring points on the upper surface of the top flange 21 of the tower 2, that is, the affixed positions of the measurement target T. FIG. 10 is a partial enlarged view of FIG. 9.

By measuring the three-dimensional coordinates of the individual measuring points of the upper surface of the top flange 21, the roughness levels of the upper surface of the top flange 21 in the state in which the nacelle 3 is not mounted on the tower 2 that is vertically erected on the base B can be obtained.

Furthermore, since a pair of measurement targets T is affixed at the inner circumference and the outer circumference of the top flange 21, the three-dimensional coordinates of the measuring points at the inner circumference and the outer circumference can be found, and thus, the radial inclination of the upper surface of the top flange 21 can be calculated from the three-dimensional coordinates of the two measuring points.

Next, the thicknesses and/or number of shim plates 10 and 10A to 10C to be disposed at the individual plurality of measuring points to adjust the unevenness of the upper surface of the top flange 21 are determined in accordance with the roughness levels of the upper surface of the top flange 21 and the radial inclination of the upper surface of the top flange 21 at the individual measuring points, which are determined in the main measurement step as described above (shim-plate-placement-plan determination step).

FIGS. 12 to 15 show the shapes of the shim plates 10 (and 10A to 10C) disposed on the upper surface of the top flange 21 of the tower 2. The shim plates 10 and 10A to 10C include the roughness compensating shim plates 10, the plate-thickness-difference compensating shim plates 10A, the inclination compensating shim plates 10B, and the inward-slant compensating shim plates 10C. The unevenness of the upper surface of the top flange 21 is compensated mainly by the roughness compensating shim plates 10 and is supplementally compensated by the plate-thickness-difference compensating shim plates 10A, the inclination compensating shim plates 10B, and the inward-slant compensating shim plates 10C with higher accuracy.

Figure 12:
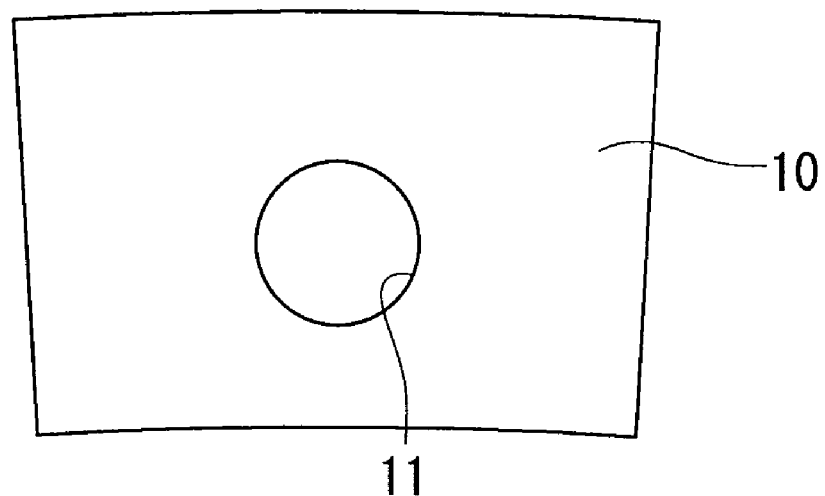
FIG. 12 is a plan view illustrating the shape of a shim plate disposed on the upper surface of the top flange of the tower.

As shown in FIG. 12, the roughness compensating shim plate 10 has a substantially sector shape in plan view, obtained by dividing the upper surface of the substantially ring-shaped top flange 21 in the circumferential direction of the top flange 21 into 50 equal parts. A bolt through-hole 11 is formed at substantially the center of the shim plate 10. Ten kinds of roughness compensating shim plates 10 with thicknesses of 0.2 mm, 0.3 mm, 0.4 mm, 0.5 mm, 0.6 mm, 0.8 mm, 1.0 mm, 1.5 mm, 2.0 mm, and 3.0 mm are prepared, as described above.

Figure 13:
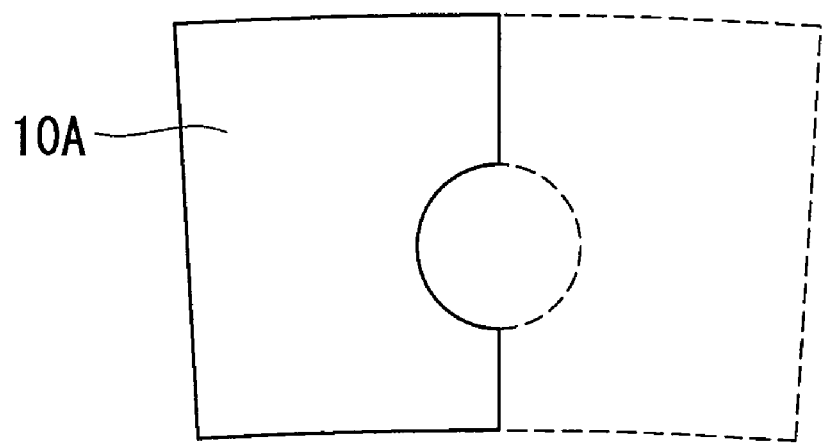
FIG. 13 is a plan view illustrating the shape of another shim plate disposed on the upper surface of the top flange of the tower.

As shown in FIG. 13, the plate-thickness-difference compensating shim plate 10A has a substantially sector shape in plan view, obtained by dividing the planar shape of the roughness compensating shim plate 10 into two right and left symmetrical parts. Four kinds of plate-thickness-difference compensating shim plates 10A with thicknesses of 0.2 mm, 0.3 mm, 0.4 mm, and 0.5 mm are prepared.

Figure 14:
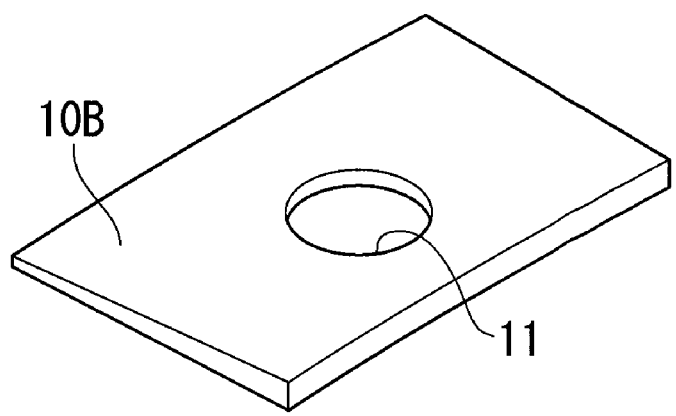
FIG. 14 is a plan view illustrating the shape of yet another shim plate disposed on the upper surface of the top flange of the tower.

As shown in FIG. 14, although the inclination compensating shim plate 10B has the same planar shape as that of the roughness compensating shim plate 10, its cross-sectional shape is tapered such that the plate thickness at the outer circumference is smaller than the plate thickness at the inner circumference. That is, the inclination compensating shim plate 10B is substantially wedge shaped in radial cross section in the state in which it is disposed on the upper surface of the top flange 21. Three kinds of inclination compensating shim plates 10B with a thickness of 0.5 mm at the outer circumference and a thickness of 0.9 mm at the inner circumference, with a thickness of 0.5 mm at the outer circumference and a thickness of 1.2 mm at the inner circumference, and with a thickness of 1.0 mm at the outer circumference and a thickness of 2.0 mm at the inner circumference are prepared.

Figure 15:
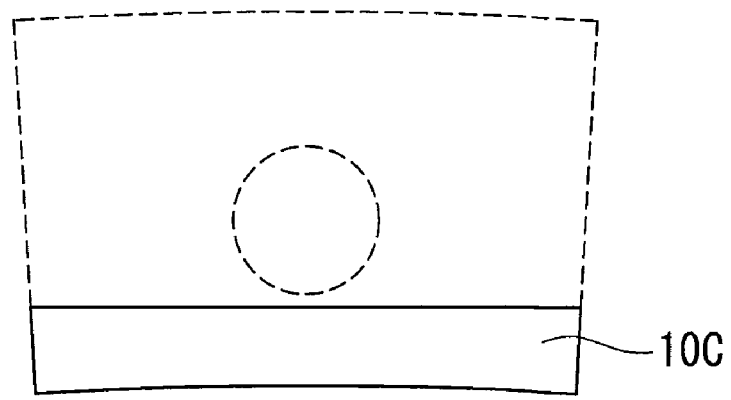
FIG. 15 is a plan view illustrating the shape of still another shim plate disposed on the upper surface of the top flange of the tower.

As shown in FIG. 15, the inward-slant compensating shim plate 10C has a substantially rectangular planar shape obtained by cutting out part of the roughness compensating shim plate 10 along the inner circumference. Three kinds of inward-slant compensating shim plates 10C with thicknesses of 0.2 mm, 0.3 mm, and 0.4 mm are prepared.

Here, zero or one of the shim plates 10 and 10A to 10C or a plurality of shim plates 10 and 10A to 10C stacked to adjust the plate thickness are disposed at every position of the fastening bolts 6 that fix the inner race 33 of the slew bearing 32 and the brake disc 31 provided at the lower end of the nacelle 3 to the top flange 21 of the tower 2, that is, each of the pair of measuring points set at the inner circumference and the outer circumference of the top flange 21.

In this shim-plate-placement-plan determination step, the thicknesses and/or number of the roughness compensating shim plates 10 are determined so that the roughness level after adjusting the unevenness, that is, the difference between the height at the widthwise center position of the upper surface of each of the shim plates 10 arranged along the circumference of the top flange 21 and a virtual base plane having a roughness level of 0 mm, becomes 0.1 mm or less.

If a difference in the roughness level of the top flange 21 between the positions of two adjacent fastening bolts 6 is large, the difference between the thickness (in total) of the roughness compensating shim plates 10 disposed at the position of one of the two fastening bolts 6 and the thickness (in total) of the roughness compensating shim plates 10 disposed at the other fastening bolt 6 is large. In this case, the difference in plate thickness shows up as a level difference at the boundary of the two roughness compensating shim plates 10 adjacent to each other in the circumferential direction of the top flange 21. To adjust the level difference caused by the difference in plate thickness, the plate-thickness-difference compensating shim plate 10A is stacked along the boundary on the roughness compensating shim plates 10 having a smaller thickness.

Let $\Delta t$ be the difference in plate thickness at the boundary. When $0.35 \text{ mm} < \Delta t \leq 0.55 \text{ mm}$, the plate-thickness-difference compensating shim plate 10A having a thickness of 0.2 mm is used. When $0.55 \text{ mm} < \Delta t \leq 0.75 \text{ mm}$, the plate-thickness-difference compensating shim plate 10A having a thickness of 0.3 mm is used. When $0.75 \text{ mm} < \Delta t \leq 0.95 \text{ mm}$, the plate-thickness-difference compensating shim plate 10A having a thickness of 0.4 mm is used. When $0.95 \text{ mm} < \Delta t$, the plate-thickness-difference compensating shim plate 10A having a thickness of 0.5 mm is used.

To adjust the radial inclination of the upper surface of the top flange 21 measured in the main measurement step, the inclination compensating shim plate 10B and/or the inward-slant compensating shim plate 10C is used. The inward-slant compensating shim plate 10C is disposed at the inner circumference of the top flange 21 relative to the bolt through-holes 22 so as to extend along the inner circumference of the top flange 21.

The radial inclination of the upper surface of the top flange 21 is expressed by, for example, the difference $\Delta z$ between a roughness level at a point 5 mm inside the outer circumference of the top flange 21 and a roughness level at a point 5 mm outside the inner circumference of the top flange 21. When $0.35 \text{ mm} \leq \Delta z < 0.45 \text{ mm}$, the inward-slant compensating shim plate 10C having a thickness of 0.2 mm is used. When $0.45 \text{ mm} \leq \Delta z < 0.55 \text{ mm}$, the inward-slant compensating shim plate 10C having a thickness of 0.3 mm is used. When $0.55 \text{ mm} \leq \Delta z$, one of the three kinds of inclination compensating shim plates 10B is used or the inward-slant compensating shim plate 10C having a thickness of 0.4 mm is used.

The shim-plate-10 placement plan thus determined is shown in the following table together with the roughness levels of the upper surface of the top flange 21 and the radial inclinations of the top flange 21 measured in the main measurement step.

| Measuring point (No. of adjacent fastening bolt) | Roughness level of upper surface of top flange | Thickness of shim plate | | | Difference in thickness between adjacent shim plates | Roughness level after adjustment of unevenness | Radial inclination of top flange (+: inward slant) | Inward-slant compensating shim plate |
|---|---|---|---|---|---|---|---|---|
| | | First | Second | Total | | | | |
| No. 1  | 0.000  | —   | —   | 0   | 0    | 0.000  | 0.152  | —   |
| No. 2  | −0.094 | —   | —   | 0   | 0    | −0.094 | 0.104  | —   |
| No. 3  | −0.188 | 0.2 | —   | 0.2 | −0.2 | 0.012  | 0.241  | —   |
| No. 4  | −0.215 | 0.2 | —   | 0.2 | 0    | −0.015 | 0.345  | —   |
| No. 5  | −0.408 | 0.4 | —   | 0.4 | −0.2 | −0.008 | 0.531  | 0.3 |
| No. 6  | −0.651 | 0.5 | 0.2 | 0.7 | −0.3 | 0.049  | 0.326  | —   |
| No. 7  | −0.962 | 1.0 | —   | 1.0 | −0.3 | 0.038  | 0.177  | —   |
| No. 8  | −1.471 | 1.5 | —   | 1.5 | −0.5 | 0.029  | 0.338  | —   |
| No. 9  | −1.204 | 1.0 | 0.2 | 1.2 | 0.3  | −0.004 | 0.736  | 0.4 |
| No. 10 | −1.620 | 1.0 | 0.6 | 1.6 | −0.4 | −0.020 | 0.170  | —   |
| No. 11 | −1.632 | 1.0 | 0.6 | 1.6 | 0    | −0.032 | 0.397  | 0.2 |
| No. 12 | −1.459 | 1.5 | —   | 1.5 | 0.1  | 0.041  | 0.464  | 0.3 |
| No. 13 | −1.467 | 1.5 | —   | 1.5 | 0    | 0.033  | 0.223  | —   |
| No. 14 | −1.569 | 1.0 | 0.6 | 1.6 | −0.1 | 0.031  | 0.343  | —   |
| No. 15 | −1.475 | 1.5 | —   | 1.5 | 0.1  | 0.025  | 0.364  | 0.2 |
| No. 16 | −1.413 | 1.0 | 0.4 | 1.4 | 0.1  | −0.013 | 0.447  | 0.2 |
| No. 17 | −1.369 | 1.0 | 0.4 | 1.4 | 0    | 0.031  | 0.304  | —   |
| No. 18 | −1.119 | 0.6 | 0.5 | 1.1 | 0.3  | −0.019 | 0.322  | —   |
| No. 19 | −0.831 | 0.8 | —   | 0.8 | 0.3  | −0.031 | −0.012 | —   |
| No. 20 | −0.880 | 0.5 | 0.4 | 0.9 | −0.1 | 0.020  | −0.371 | —   |
| No. 21 | −0.746 | 0.5 | 0.2 | 0.7 | 0.2  | −0.046 | −0.233 | —   |
| No. 22 | −0.638 | 0.6 | —   | 0.6 | 0.1  | −0.038 | −0.214 | —   |
| No. 23 | −0.478 | 0.5 | —   | 0.5 | 0.1  | 0.022  | −0.051 | —   |
| No. 24 | −0.408 | 0.4 | —   | 0.4 | 0.1  | −0.008 | 0.164  | —   |
| No. 25 | −0.247 | 0.2 | —   | 0.2 | 0.2  | −0.047 | 0.185  | —   |
| No. 26 | −0.150 | 0.2 | —   | 0.2 | 0    | 0.050  | −0.088 | —   |
| No. 27 | −0.108 | 0.2 | —   | 0.2 | 0    | 0.092  | 0.087  | —   |
| No. 28 | −0.032 | —   | —   | 0   | 0.2  | −0.032 | 0.084  | —   |
| No. 29 | −0.046 | —   | —   | 0   | 0    | −0.046 | 0.393  | 0.2 |
| No. 30 | −0.133 | 0.2 | —   | 0.2 | −0.2 | 0.067  | 0.446  | 0.2 |
| No. 31 | −0.180 | 0.2 | —   | 0.2 | 0    | 0.020  | 0.069  | —   |
| No. 32 | −0.296 | 0.3 | —   | 0.3 | −0.1 | 0.004  | 0.311  | —   |
| No. 33 | −0.652 | 0.5 | 0.2 | 0.7 | −0.4 | 0.048  | 0.380  | 0.2 |
| No. 34 | −0.906 | 0.6 | 0.3 | 0.9 | −0.2 | −0.006 | 0.384  | 0.2 |
| No. 35 | −1.145 | 1.0 | 0.2 | 1.2 | −0.3 | 0.055  | 0.405  | 0.2 |
| No. 36 | −1.363 | 1.0 | 0.4 | 1.4 | −0.2 | 0.037  | 0.265  | —   |
| No. 37 | −1.285 | 1.0 | 0.3 | 1.3 | 0.1  | 0.015  | 0.356  | 0.2 |
| No. 38 | −1.355 | 1.0 | 0.4 | 1.4 | −0.1 | 0.045  | 0.414  | 0.2 |
| No. 39 | −1.843 | 1.0 | 0.8 | 1.8 | −0.4 | −0.043 | 0.286  | —   |
| No. 40 | −1.718 | 1.5 | 0.2 | 1.7 | 0.1  | −0.018 | 0.088  | —   |
| No. 41 | −1.892 | 1.5 | 0.4 | 1.9 | −0.2 | 0.008  | 0.171  | —   |
| No. 42 | −1.772 | 1.5 | 0.2 | 1.7 | 0.2  | −0.072 | 0.132  | —   |
| No. 43 | −1.561 | 1.0 | 0.6 | 1.6 | 0.1  | 0.039  | −0.292 | —   |
| No. 44 | −1.191 | 1.0 | 0.2 | 1.2 | 0.4  | 0.009  | −0.210 | —   |
| No. 45 | −0.911 | 0.5 | 0.4 | 0.9 | 0.3  | −0.011 | −0.321 | —   |
| No. 46 | −0.944 | 0.5 | 0.4 | 0.9 | 0    | −0.044 | 0.129  | —   |
| No. 47 | −0.821 | 0.8 | —   | 0.8 | 0.1  | −0.021 | 0.352  | 0.2 |
| No. 48 | −0.425 | 0.4 | —   | 0.4 | 0.4  | −0.025 | 0.082  | —   |
| No. 49 | −0.161 | 0.2 | —   | 0.2 | 0.2  | 0.039  | −0.065 | —   |
| No. 50 | −0.029 | —   | —   | 0   | 0.2  | −0.029 | 0.286  | —   |

Figure 11:
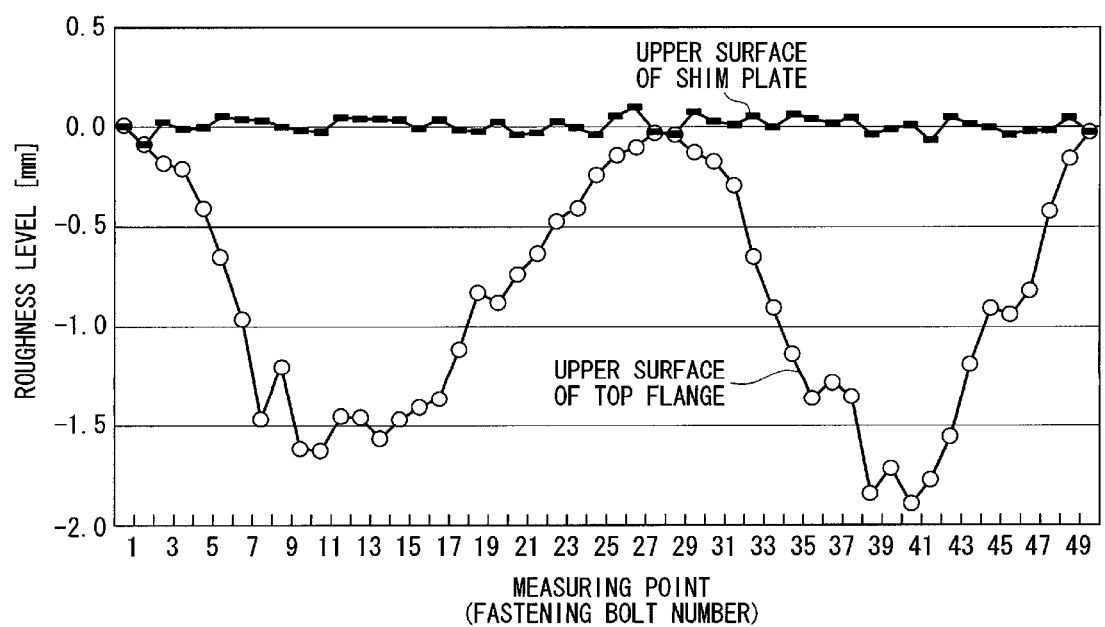
FIG. 11 is a graph illustrating the roughness levels of the upper surface of the top flange of the tower measured with the nacelle removed from the top flange and the state of adjustment of the unevenness by disposing shim plates on the upper surface of the top flange.

The roughness levels of the upper surface of the top flange 21 measured in the main measurement step and the roughness levels after the unevenness is adjusted using the shim plates 10 and 10A to 10C disposed according to the above placement plan are shown on the graph in FIG. 11.

As shown on the above table and the graph in FIG. 11, the shim plates 10 are disposed on the upper surface of the top flange 21 so that the difference between the height of the upper surface at the widthwise center position of each shim plate 10 and the virtual base plane with a roughness level of 0 mm is less than 0.1 mm.

Figure 16:
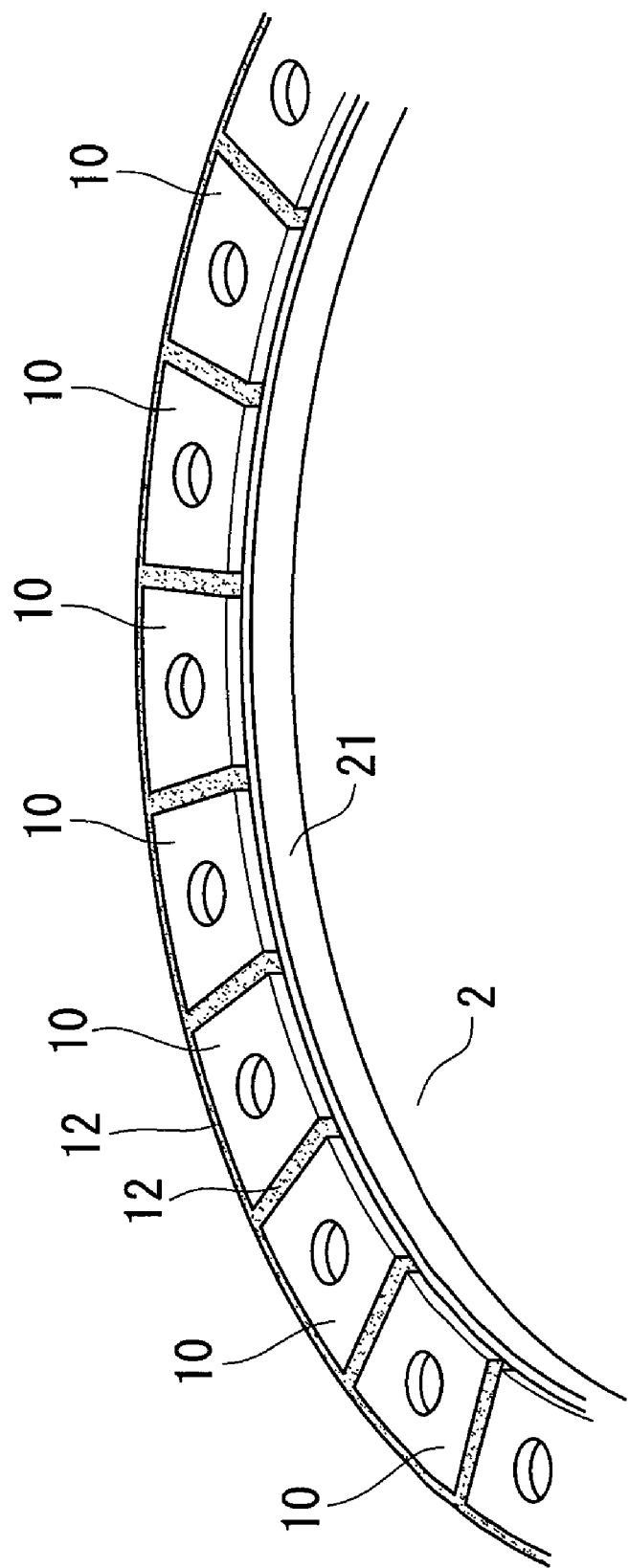
FIG. 16 is a perspective view illustrating the placement of shim plates on the upper surface of the top flange of the tower.

The shim plates 10 and 10A to 10C are disposed on the upper surface of the top flange 21 in accordance with the placement plan for the shim plates 10 and 10A to 10C determined in the above-described shim-plate-placement-plan determination step (shim-plate placement step). An example of the placement of the shim plates 10 (and 10A to 10C) is shown in the perspective view of FIG. 16. Here, the shim plates 10 (and 10A to 10C) are disposed on the upper surface of the top flange 21 such that the bolt through-holes 11 in the shim plates 10 (and 10B) overlap with the bolt through-holes 22 provided at 50 positions of the top flange 21. As shown in FIG. 16, sealing 12 is applied around the outer circumference of the shim plates 10 (and 10A to 10C) and between the adjacent shim plates 10 (and 10A to 10C) to prevent rainwater etc. from entering the tower 2.

After the shim-plate placement step, the nacelle 3 is mounted and fixed on the top flange 21 on which the shim plates 10 and 10A to 10C are disposed. Specifically, the fastening bolts 6 are passed through the bolt through-holes 22 of the top flange 21 and the bolt through-holes 11 of the shim plates 10 and 10B, which are stacked vertically, and the inner race 33 of the slew bearing and the brake disc 31 provided at the lower end of the nacelle 3 are fastened to the top flange 21 of the tower 2 together with the shim plates 10 and 10A to 100 using the fastening bolts 6.

In this state, it is determined whether the level differences among the upper surfaces of the shim plates 10 and 10A to 10C disposed on the upper surface of the top flange 21 are at or below a predetermined value (determination step).

In the determination step, the roughness levels of the upper surface of the top flange 21 in the state in which the nacelle 3 is mounted on the tower 2 are measured by the same method as in the above-described auxiliary measurement step. If the measurements in the determination step match the measurements in the main measurement step, it is determined that the unevenness of the top flange 21 is adjusted by the shim plates 10 and 10A to 10C, so that the flatness of the upper surfaces of the shim plates 10 and 10A to 10C is ensured. If the measurements in the determination step do not match the measurements in the main measurement step, it is determined that the unevenness of the top flange 21 has not sufficiently been adjusted by the shim plates 10 and 10A to 100, so that the nacelle 3 is removed from the tower 2, and the above-described main measurement step, shim-plate-placement-plan determination step, and shim-plate placement step are performed again to rearrange the shim plates 10 and 10A to 10C on the upper surface of the top flange 21 of the tower 2.

According to the method for adjusting the unevenness of the top flange of a wind turbine generator tower of this embodiment, since the unevenness of the upper surface of the top flange 21 is adjusted by disposing the roughness compensating shim plates 10 each having a planar shape obtained by dividing the upper surface of the top flange 21 of the tower 2 for the wind turbine generator 1 into 50 equal parts on the upper surface of the top flange 21 and by adjusting the thicknesses and/or number of the roughness compensating shim plates 10, the plate-thickness-difference compensating shim plates 10A, the inclination compensating shim plates 10B, and the inward-slant compensating shim plates 10C to be disposed at individual positions, the unevenness of the top flange 21 of the tower 2 of either the constructed wind turbine generator 1 or the wind turbine generator 1 newly being constructed can be reliably adjusted by a simple operation.

In particular, since the unevenness of the upper surface of the top flange 21 is adjusted by adjusting the thicknesses and/or number of the roughness compensating shim plates 10, the plate-thickness-difference compensating shim plates 10A, the inclination compensating shim plates 10B, and the inward-slant compensating shim plates 10C, the unevenness of the top flange 21 can be adjusted in a short time.

Furthermore, in the case where the unevenness of the upper surface of the top flange 21 of the tower 2 of the constructed wind turbine generator 1 is adjusted, the auxiliary measurement step of measuring the roughness levels of the upper surface of the top flange 21 is performed in the state in which the nacelle 3 is mounted on the tower 2 before the nacelle 3 is removed from the top of the tower 2 prior to the main measurement step of measuring the roughness levels of the upper surface of the top flange 21, with the nacelle 3 removed from the top of the tower 2. Then, the shim-plate-placement-plan estimation step of estimating the thicknesses and/or number of the roughness compensating shim plates 10 necessary for adjusting the unevenness of the top flange 21 in advance from the roughness levels of the upper surface of the top flange 21 measured in the auxiliary measurement step is performed.

Accordingly, rather than preparing the roughness compensating shim plates 10 necessary for adjusting the unevenness of the top flange 21 after completion of the main measurement step and the shim-plate-placement-plan determination step, the thicknesses and/or number of the roughness compensating shim plates 10 necessary for adjusting the unevenness of the top flange 21 can be roughly estimated in the shim-plate-placement-plan estimation step immediately after the auxiliary measurement step, and the roughness compensating shim plates 10 of the estimated plate thicknesses and/or number can be prepared in advance. This can shorten the construction period necessary for adjusting the unevenness of the top flange 21 as compared with a case in which the roughness compensating shim plates 10 are prepared after completion of the main measurement step and the shim-plate-placement-plan determination step.

In the case where the unevenness of the upper surface of the top flange 21 of the tower 2 of the constructed wind turbine generator 1 is adjusted, the roughness levels of the upper surface of the top flange 21 cannot be directly measured in the auxiliary measurement step because the nacelle 3 is mounted on the top flange 21 of the tower 2. However, according to the method for adjusting the unevenness of the top flange of a wind turbine generator tower of this embodiment, the roughness levels of the lower surface of the top flange 21 and the plate thicknesses of the top flange 21 are measured, and then the roughness levels of the upper surface of the top flange 21 are obtained from the roughness levels of the lower surface of the top flange 21 and the plate thicknesses of the top flange 21. Therefore, even if the nacelle 3 is mounted on the top flange 21 of the tower 2, the roughness levels of the upper surface of the top flange 21 can be measured.

Likewise, in the case where the unevenness of the upper surface of the top flange 21 of the tower 2 of the constructed wind turbine generator 1 is adjusted, the plate thicknesses of the top flange 21 cannot be directly measured in the auxiliary measurement step because the nacelle 3 is mounted on the top flange 21 of the tower 2. However, according to the method for adjusting the unevenness of the top flange of a wind turbine generator tower of this embodiment, the plate thicknesses of the top flange 21 are measured from the lower surface of the top flange 21 by ultrasonic plate thickness measurement. Therefore, even if the nacelle 3 is mounted on the top flange 21 of the tower 2, the thicknesses of the top flange 21 can be measured.

Furthermore, in the case where the unevenness of the upper surface of the top flange 21 of the tower 2 of the wind turbine generator 1 newly being constructed is adjusted, the auxiliary measurement step of measuring the roughness levels of the upper surface of the top flange 21 is performed in the state in which the tower 2 is placed horizontally before the tower 2 is vertically erected, prior to the main measurement step of measuring the roughness levels of the upper surface of the top flange 21 after the tower 2 is vertically erected. Then, the shim-plate-placement-plan estimation step of estimating the thicknesses and/or number of the roughness compensating shim plates 10 necessary for adjusting the unevenness of the top flange 21 in advance from the roughness levels of the upper surface of the top flange 21 measured in the auxiliary measurement step is performed.

Accordingly, rather than preparing the roughness compensating shim plates 10 necessary for adjusting the unevenness of the top flange 21 after completion of the main measurement step and the shim-plate-placement-plan determination step, the thicknesses and/or number of the roughness compensating shim plates 10 necessary for adjusting the unevenness of the top flange 21 can be roughly estimated in the shim-plate-placement-plan estimation step immediately after the auxiliary measurement step, and the roughness compensating shim plates 10 of the estimated plate thicknesses and/or number can be prepared in advance. This can shorten the construction period necessary for adjusting the unevenness of the top flange 21 as compared with a case in which the roughness compensating shim plates 10 are prepared after completion of the main measurement step and the shim-plate-placement-plan determination step.

According to the method for adjusting the unevenness of the top flange of a wind turbine generator tower of this embodiment, after the roughness compensating shim plates 10, the plate-thickness-difference compensating shim plates 10A, the inclination compensating shim plates 10B, and the inward-slant compensating shim plates 10C are disposed on the upper surface of the top flange 21 to adjust the unevenness of the upper surface of the top flange 21, it is determined in the determination step whether the level differences among the upper surfaces of the shim plates 10 and 10A to 10C are at or below a predetermined value. This allows the accuracy of adjustment of the unevenness of the top flange 21 of the tower 2 to be made more reliable.

If it is determined in this determination step that the level differences among the upper surfaces of the shim plates 10 and 10A to 10C are not at or below the predetermined value, the main measurement step, the shim-plate-placement-plan determination step, and the shim-plate placement step are performed again to rearrange the shim plates 10 and 10A to 10C on the upper surface of the top flange 21. When it is determined that the level differences among the upper surfaces of the rearranged shim plates 10 and 10A to 10C are at or below the predetermined value, the adjustment of the unevenness of the upper surface of the top flange 21 is completed. This allows the accuracy of adjustment of the unevenness of the top flange 21 of the tower 2 to be made more reliable.

Furthermore, according to the method for adjusting the unevenness of the top flange of a wind turbine generator tower of this embodiment, the radial inclination of the upper surface of the top flange 21 is measured, and the thicknesses and/or number of the shim plates 10 and 10A to 10C (particularly, the inclination compensating shim plates 10B and the inward-slant compensating shim plates 100) to be disposed on the upper surface of the top flange 21 are determined so as to compensate for the measured radial inclination of the upper surface of the top flange 21. Since the radial inclination of the upper surface of the top flange 21 is compensated for using the shim plates 10 and 10A to 10C (particularly, the inclination compensating shim plates 10B and/or the inward-slant compensating shim plates 100) disposed on the upper surface of the top flange 21, the slant of the slew bearing 32 mounted on the top flange 21 can be compensated for.

According to the method for adjusting the unevenness of the top flange of a wind turbine generator tower of this embodiment, when the nacelle 3 is fixed to the top flange 21 of the tower 2 with the fastening bolts 6, the fastening bolts 6 are passed through the bolt through-holes 11 formed in the shim plates 10 and 10B disposed on the upper surface of the top flange 21, so that the shim plates 10 and 10A to 10C are fixed to the top flange 21, together with the nacelle 3, with the fastening bolts 6. Accordingly, the shim plates 10 and 10A to 10C disposed on the upper surface of the top flange 21 are firmly fastened to the top flange 21 with the fastening bolts 6, so that the shim plates 10 and 10A to 10C do not move or come out from the mounted positions after the nacelle 3 is fixed to the top flange 21 of the tower 2.

Furthermore, according to the method for adjusting the unevenness of the top flange of a wind turbine generator tower of this embodiment, since the shim plates 10 have a substantially sector shape in plan view, obtained by dividing the upper surface of the substantially ring-shaped top flange 21 in the circumferential direction of the top flange 21 into 50 equal parts, the shim plates 10 can be spread all over substantially the entire upper surface of the top flange 21 even if the shim plates 10 have one planar shape. Although the top flange 21 of the tower 2 is under a large contact pressure from the nacelle 3, this large contact pressure can be reliably supported by the shim plates 10 spread over substantially the entire upper surface of the top flange 21.

The method for adjusting the unevenness of the top flange of a wind turbine generator tower of the present invention is not limited to the above embodiment.

For example, in the above embodiment, although the top flange 21 of the tower 2 has 50 bolt through-holes 22, the number of bolt through-holes provided in the top flange of the tower is not limited thereto. For example, if the number of bolt through-holes provided in the top flange is 40, shim plates having a planar shape obtained by dividing the upper surface of this top flange into 40 equal parts may be disposed on the upper surface of the top flange to adjust the unevenness of the upper surface of the top flange.

Furthermore, the shape of the shim plates may be set so that one shim plate corresponds to two bolt through-holes 22 in the top flange 21.

In the above embodiment, the determination step is performed by measuring the roughness levels of the upper surface of the top flange 21, with the nacelle 3 mounted on the tower 2. Instead, the determination step may be performed by confirming by calculation that the "Roughness level after adjustment of unevenness" in the above table is less than a predetermined value (for example, 0.1 mm).

Furthermore, the main measurement step may be omitted by finally determining the thicknesses and/or number of shim plates to be disposed on the basis of the measurements in the auxiliary measurement step of this embodiment.

Thus, the method for adjusting the unevenness of the top flange of a wind turbine generator tower of the present invention can be appropriately modified without departing from the spirit thereof.

What is claimed is:

1. A method for adjusting an unevenness of a top flange of a wind turbine generator tower in which the unevenness of an upper surface of the top flange is adjusted by arranging shim plates on the upper surface of the top flange and by adjusting a thicknesses and/or number of the shim plates to be disposed at individual positions, the method comprising:
    a main measurement step of measuring roughness levels of the upper surface of the top flange at a plurality of measuring points in a state in which a nacelle of the wind turbine generator is not mounted on the tower which is vertically erected;
    a shim-plate-placement-plan determination step of determining the thicknesses and/or number of the shim plates to be disposed on the individual plurality of measuring points to adjust the unevenness of the upper surface of the top flange in accordance with the roughness levels of the upper surface of the top flange measured in the main measurement step; and
    a shim-plate placement step of placing the shim plates on the individual plurality of measuring points on the upper surface of the top flange in accordance with the thicknesses and/or number of the shim plates determined in the shim-plate-placement-plan determination step;
    an auxiliary measurement step of measuring the roughness levels of the upper surface of the top flange at the plurality of measuring points, prior to the main measurement step, in a state in which the nacelle is mounted on the tower, which is vertically erected; and a shim-plate-placement-plan estimation step of estimating, in advance, the thicknesses and/or number of the shim plates to be determined in the shim-plate-placement-plan determination step from the roughness levels of the upper surface of the top flange measured in the auxiliary measurement step.

2. The method for adjusting the unevenness of the top flange of a wind turbine generator tower according to claim 1, wherein in the auxiliary measurement step, the roughness levels of a lower surface of the top flange and a plate thicknesses of the top flange at the plurality of measuring points, are measured, and the roughness levels of the upper surface of the top flange are obtained from the roughness levels of the lower surface of the top flange and the plate thicknesses of the top flange.

3. The method for adjusting the unevenness of the top flange of a wind turbine generator tower according to claim 2, wherein the plate thicknesses of the top flange are measured from the lower surface of the top flange by ultrasonic plate-thickness measurement.

4. The method for adjusting the unevenness of the top flange of a wind turbine generator tower according to claim 3, wherein the plate thicknesses are measured when the nacelle is mounted on the top flange of the tower.

5. The method for adjusting the unevenness of the top flange of a wind turbine generator tower according to claim 1, further comprising:
a determination step of determining, after the shim-plate placement step, whether level differences among upper surfaces of the shim plates disposed on the upper surface of the top flange are at or below a predetermined value.

6. The method for adjusting the unevenness of the top flange of a wind turbine generator tower according to claim 1, wherein in the shim-plate-placement-plan determination step, the thicknesses and/or number of the shim plates are determined so that a difference in plate thickness between the shim plates disposed next to each other is a predetermined value or less than the predetermined value.

7. The method for adjusting the unevenness of the top flange of a wind turbine generator tower according to claim 1, wherein
in the main measurement step, a radial inclination of the upper surface of the top flange is measured; and
in the shim-plate-placement-plan determination step, the thicknesses and/or number of the shim plates to be disposed on the individual plurality of measuring points to adjust the unevenness of the upper surface of the top flange are determined in accordance with the roughness levels of the upper surface of the top flange and the radial inclination of the upper surface of the top flange measured in the main measurement step.

8. The method for adjusting the unevenness of the top flange of a wind turbine generator tower according to claim 7, wherein, in the main measurement step, the radial inclination of the top flange is measured on a basis of three-dimensional coordinates of measurement targets that are affixed along an inner circumference and an outer circumference of the top flange.

9. The method for adjusting the unevenness of the top flange of a wind turbine generator tower according to claim 1, wherein
the shim plates have bolt through-holes; and
the shim plates are fixed to the upper surface of the top flange using the bolt through-holes.

10. The method for adjusting the unevenness of the top flange of a wind turbine generator tower according to claim 1, wherein the top flange is substantially ring-shaped and the shim plates have a substantially sector shape in plan view, obtained by dividing the upper surface of the substantially ring-shaped top flange into a plurality of parts in a circumferential direction of the top flange.

* * * * *